(12) United States Patent
Xiang

(10) Patent No.: US 12,053,790 B2
(45) Date of Patent: Aug. 6, 2024

(54) DEVICE FOR ASSISTING COATING OF RADIAL SELF-SEALING TIRE OF TRUCK AND BUS

(71) Applicant: Xiaocun Xiang, Suzhou (CN)

(72) Inventor: Xiaocun Xiang, Suzhou (CN)

( * ) Notice: Subject to any disclaimer, the term of this patent is extended or adjusted under 35 U.S.C. 154(b) by 367 days.

(21) Appl. No.: 17/714,868

(22) Filed: Apr. 6, 2022

(65) Prior Publication Data

US 2022/0226855 A1   Jul. 21, 2022

(30) Foreign Application Priority Data

Sep. 8, 2021  (CN) .......................... 202122161732.7

(51) Int. Cl.
    *B60C 25/138*   (2006.01)
    *B05B 13/06*    (2006.01)
    *B29D 30/06*    (2006.01)

(52) U.S. Cl.
    CPC ...... *B05B 13/0645* (2013.01); *B29D 30/0685* (2013.01)

(58) Field of Classification Search
    CPC ..... B60C 25/00; B60C 25/05; B60C 25/0518; B60C 25/128; B23Q 3/069; B23Q 3/00
    See application file for complete search history.

(56) References Cited

U.S. PATENT DOCUMENTS

| 8,904,863 | B1 * | 12/2014 | Voeller | B60C 25/138 |
| | | | | 73/66 |
| 9,434,219 | B1 * | 9/2016 | Clasquin | B60C 25/02 |
| 9,902,221 | B2 * | 2/2018 | Corghi | B60C 25/059 |
| 11,712,932 | B2 * | 8/2023 | Gonzaga | B60C 25/0548 |
| | | | | 157/1.1 |
| 2012/0049429 | A1 * | 3/2012 | Lindberg | A01G 23/006 |
| | | | | 29/559 |

FOREIGN PATENT DOCUMENTS

| CN | 103350619 B | 5/2016 |
| CN | 209423929 U | 9/2019 |
| CN | 110788101 A | 2/2020 |
| JP | S6211665 B2 | 3/1987 |
| WO | 2004060644 A1 | 7/2004 |

* cited by examiner

*Primary Examiner* — Lee D Wilson

(57) ABSTRACT

A device for assisting the coating of a radial self-sealing tire of trucks and buses, including: a support frame and a positioning frame. Both ends of a top of a side of the support frame are fixedly provided with a first bearing through a bearing seat, respectively. Two first bearings are arranged coaxially, and the positioning frame is rotatably connected between the two first bearings. Two chutes are arranged inside the support frame and opposite to a fixing frame. The two chutes are slidably connected with a sliding connection seat, respectively. A lifting frame is arranged between two sliding connection seats.

9 Claims, 5 Drawing Sheets

DEVICE FOR ASSISTING COATING OF RADIAL SELF-SEALING TIRE OF TRUCK AND BUS

CROSS-REFERENCE TO RELATED APPLICATIONS

This application claims the benefit of priority from Chinese Patent Application No. 202122161732.7, filed on Sep. 8, 2021. The content of the aforementioned application, including any intervening amendments thereto, is incorporated herein by reference in its entirety.

TECHNICAL FIELD

This application relates to tire processing, and more specifically to a device for assisting the coating of a radial self-sealing tire of trucks and buses.

BACKGROUND

Tires are annular elastic rubber products that roll on the ground and are assembled on various vehicles or machinery. Tires are usually installed on a metal rim to support the vehicle body, buffer an external impact, and realize the contact with the road surface to ensure the driving performance of the vehicle. Recently, more and more attention has been paid to the tire safety. Radial self-sealing tires have received extensive attention owing to their excellent anti-puncture anti-bursting and zero-pressure continuous driving performances. With the advancement of the self-sealing tires, this technique has been gradually applied to the radial tires of trucks and buses.

Currently, the truck-bus radial self-sealing tires are generally produced by spraying. In the manufacture process, a cleaning machine is specially designed to clean an inner wall of the truck-bus radial self-sealing tire treads, and a customized spraying machine is adopted to evenly spray a polymer material on an inner wall of the tire surface in contact with the ground. Considering the large size and weight of the truck-bus radial self-sealing tire, the coating process is more difficult and complex, and raises higher requirements for the spraying machine. In the actual production process, the supporting machine drives the tire to rotate at a high speed, which may cause the occurrence of severe jump, thereby causing an incomplete cleaning on the inner wall of the tire tread and an uneven spraying of the polymer material. As a consequence, the manufactured radial self-sealing tires have a poor dynamic balance performance and suffer from potential safety hazards, thereby limiting the development of the truck-bus radial self-sealing tires.

SUMMARY

An object of the present disclosure is to provide a device for assisting the coating of a radial self-sealing tire of trucks and buses to solve the above problems in the prior art that in the actual production process of the truck-bus radial self-sealing tires, a supporting machine drives the radial self-sealing tire to rotate at a high speed, which will cause the occurrence of severe jump, and further cause an incomplete cleaning on the inner wall of the tire tread and an uneven spraying of the polymer material, leading to poor dynamic balance performance and safety, and limiting the development and application of the truck-bus radial self-sealing tires.

The technical solutions of the present disclosure are described as follows.

This application provides a device for assisting coating of a radial self-sealing tire of trucks and buses, comprising:
a support frame; and
a positioning frame;
wherein both ends of a top of one side of the support frame are fixedly provided with a first bearing through a bearing seat, respectively; two first bearings are arranged coaxially; the positioning frame is rotatably connected between the two first bearings; two chutes are arranged spaced apart inside the support frame; the two chutes are arranged opposite to a fixing frame; the two chutes are slidably connected with a sliding connection seat, respectively; a lifting frame is arranged between two sliding connection seats; a rotation seat is fixedly arranged at a middle of the lifting frame; the lifting frame is rotatably connected with a cylinder through the rotation seat; a telescopic end of the cylinder is connected with a drive rod; an end of the drive rod away from the cylinder is rotatably connected to the positioning frame; the cylinder is configured to drive the drive rod to extend and retract along an axial direction of the drive rod; and the drive rod is configured to drive the positioning frame to rotate around a central axis between the two first bearings to make the positioning frame tangent to a tread of the radial self-sealing tire.

In an embodiment, the positioning frame comprises a connecting rod, a rotating shaft, two positioning mobile frames and a positioning roller; and an end of the connecting rod is fixedly connected to a middle of the rotating shaft; a side of the rotating shaft away from the connecting rod is fixedly provided with the two positioning mobile frames; one of the two positioning mobile frames is arranged at one side of the connecting rod, and the other of the two positioning mobile frames is arranged at the other side of the connecting rod; an end of each of the two positioning mobile frames away from the rotating shaft is fixedly provided with a second bearing; two second bearings are arranged coaxially; the positioning roller is rotatably arranged between the two second bearings; one end of the rotating shaft is rotatably connected with one of the two first bearings, and the other end of the rotating shaft is rotatably connected with the other of the two first bearings; an end of the connecting rod away from the rotating shaft is rotatably connected to a top of the drive rod; the cylinder is configured to drive the drive rod to extend and retract along the axial direction of the drive rod, and the drive rod is configured to drive the connecting rod to turn over to drive the rotating shaft to rotate; and the rotating shaft is configured to drive the two positioning mobile frames and the positioning roller rotatably connected between the two positioning mobile frames to turn over to make the positioning roller tangent to the tread of the radial self-sealing tire.

In an embodiment, the fixing frame is fixedly arranged at a bottom of an interior of the support frame; the fixing frame is provided with a reducer; the reducer is provided with a drive motor; an output end of the drive motor is in transmission connection with an input end of the reducer; the reducer is connected with the lifting frame; and the drive motor is configured to supply power for the reducer, and drive the lifting frame to rise and fall through the reducer.

In an embodiment, an output end of the reducer is in transmission connection with a screw rod; a thread insert is fixedly arranged on the lifting frame, and is threadedly connected to the screw rod; and the drive motor is configured to drive the screw rod to rotate around an axis of the screw rod through the reducer to allow the thread insert to drive the lifting frame to rise and fall.

In an embodiment, a line pipe is fixedly arranged on a side of an interior of the support frame, and the line pipe is configured to accommodate lines required by the device.

In an embodiment, four corners of a bottom of the support frame are fixedly connected with a support pad, respectively, and the support pad is configured to support the support frame.

In an embodiment, the support frame is fixedly provided with two support members, and the two support members are arranged below the two first bearings.

In an embodiment, a mounting seat is fixedly arranged at a bottom of each of two sides of the support frame adjacent to the positioning frame.

In an embodiment, two mounting seats are each fixedly provided with a rubber buffer pad.

Compared to the prior art, the present disclosure has the following beneficial effects.

The device provided herein has a simple structure, easy operation and low cost. In addition, the device can prevent the tire from jumping while running at high speed during the coating to ensure the uniform coating, improving the processing quality and efficiency.

Figure 1:
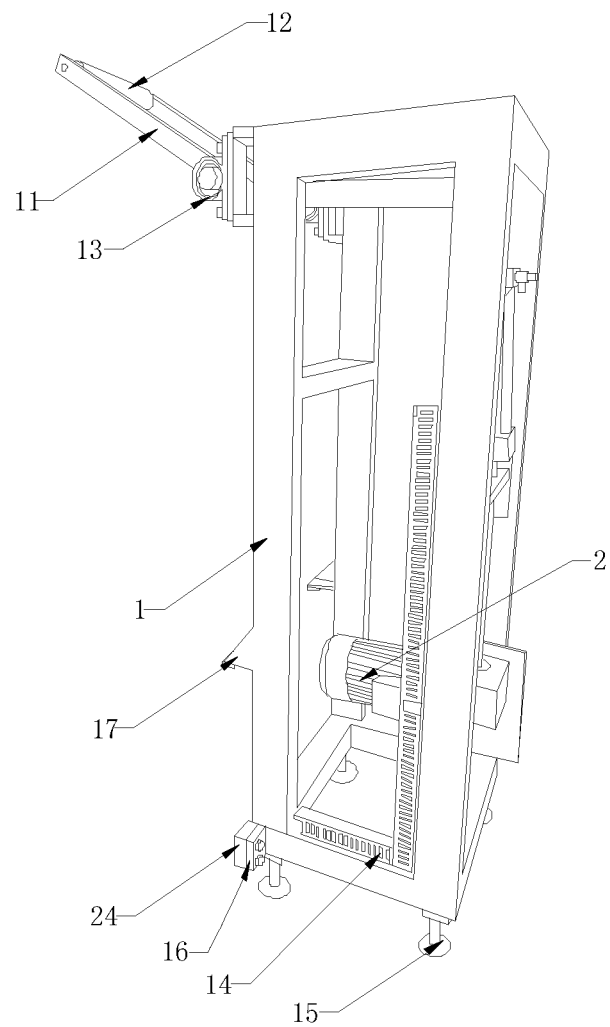
FIG. 1 is a perspective view of a device for assisting the coating of a radial self-sealing tire of trucks and buses according to an embodiment of the present disclosure.

In the drawings: 1, support frame; 2, drive motor; 3, reducer; 4, fixing frame; 5, screw rod; 6, lifting frame; 7, rotation seat; 8, cylinder; 9, drive rod; 10, rotating shaft; 11, positioning frame; 12, positioning roller; 13, first bearing; 14, line pipe; 15, support pad; 16, mounting seat; 17, support member; 18, chute; 19, thread insert; 20, sliding connection seat; 21, connecting rod; 22, positioning mobile frame; 23, second bearing; and 24, rubber buffer pad.

DETAILED DESCRIPTION OF EMBODIMENTS

The technical solutions of the present disclosure will be described completely and clearly below with reference to the accompanying drawings and embodiments.

As shown in FIGS. 1-5, a device for assisting the coating of a truck-bus radial self-sealing tire is provided, which includes a support frame 1 and a positioning frame 11. Both ends of a top of one side of the support frame 1 are fixedly provided with a first bearing 13 through a bearing seat, respectively. Two first bearings 13 are arranged coaxially. The positioning frame 11 is rotatably connected between the two first bearings 13. Two chutes 18 are arranged spaced apart inside the support frame 1. The two chutes 18 are arranged opposite to a fixing frame 4. The two chutes 18 are slidably connected with a sliding connection seat 20, respectively. A lifting frame 6 is arranged between two sliding connection seats 20. A rotation seat 7 is fixedly arranged at a middle of the lifting frame 6. The lifting frame 6 is rotatably connected with a cylinder 8 through the rotation seat 7. A telescopic end of the cylinder 8 is connected with a drive rod 9. An end of the drive rod 9 away from the cylinder 8 is rotatably connected to the positioning frame 11. The cylinder 8 is configured to drive the drive rod 9 to extend and retract along an axial direction of the drive rod 9. During the retraction process of the drive rod 9, an angle between the lifting frame 6 and the cylinder 8 changes. Since the lifting frame 6 is rotatably connected to the cylinder 8 via the rotation seat 7, the cylinder 8 can experience an angular deflection to ensure that the cylinder 8 drives the drive rod 9 to extend and retract along the axial direction of the drive rod 9. The drive rod 9 is configured to drive the positioning frame 11 to rotate around a central axis between the two first bearings 13 to make the positioning frame 11 tangent to a tread of the radial self-sealing tire, so that when a supporting machine drives the truck-bus radial self-sealing tire to rotate at high speed, the positioning roller 12 can abut against the tire tread, so as to avoid the violent jumping of the truck-bus radial self-sealing tire, ensuring the even coating of the truck-bus radial self-sealing tire.

Figure 2:
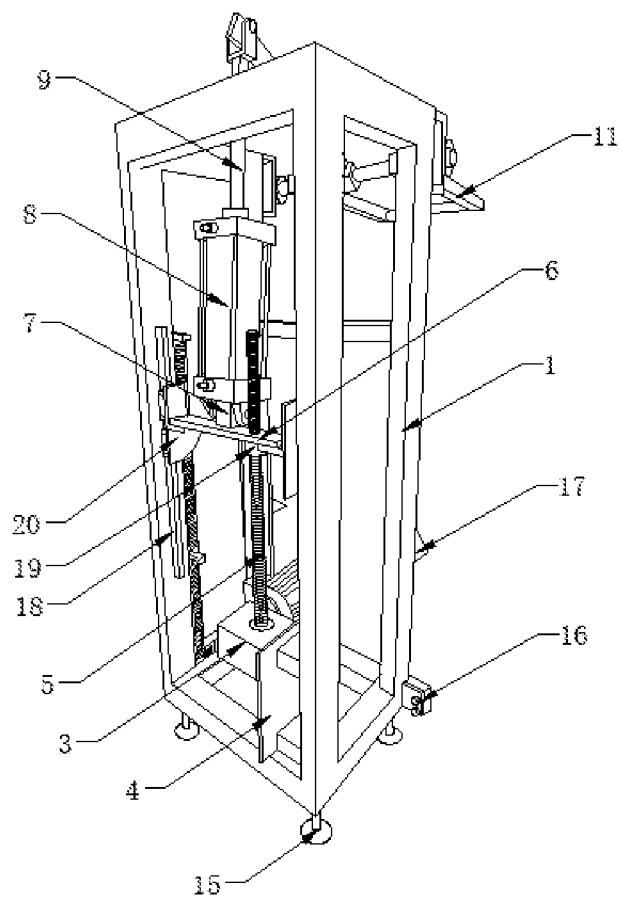
FIG. 2 is a perspective view of the device according to an embodiment of the present disclosure from another perspective.
Figure 3:
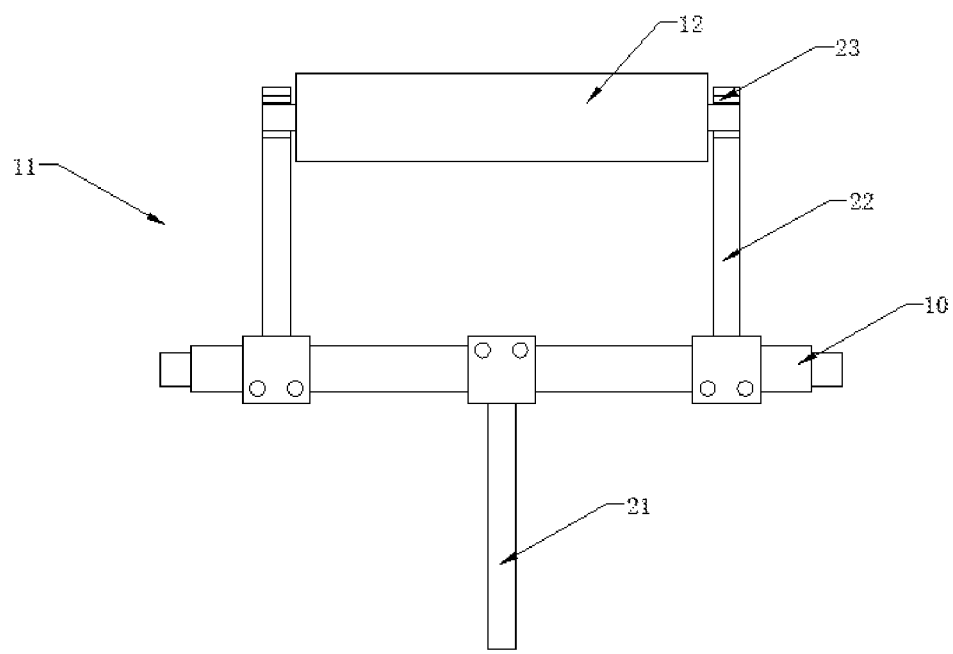
FIG. 3 schematically illustrates a structure of a positioning frame of the device according to an embodiment of the present disclosure.
Figure 4:
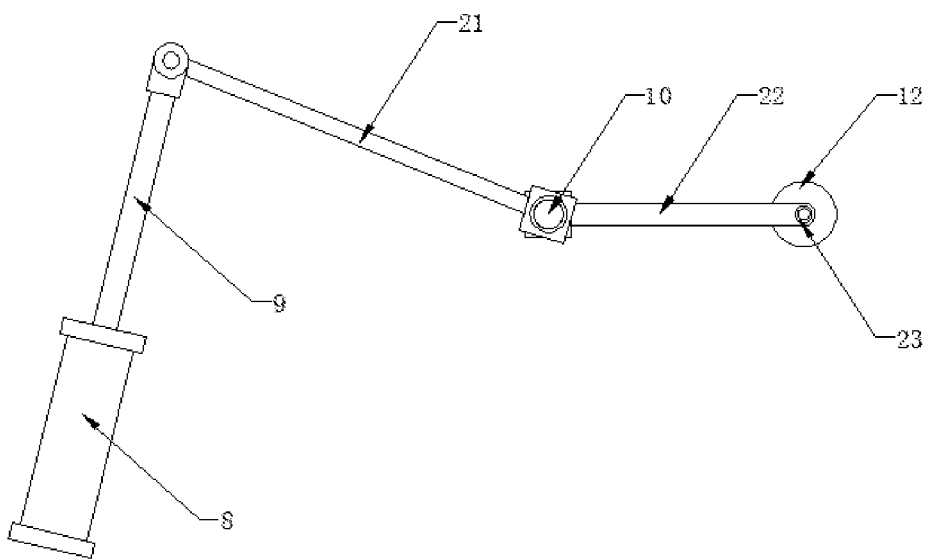
FIG. 4 is a partial structural schematic diagram of the device according to an embodiment of the present disclosure.

As shown in FIGS. 2-4, the positioning frame 11 includes a connecting rod 21, a rotating shaft 10, two positioning mobile frames 22 and a positioning roller 12. An end of the connecting rod 21 is fixedly connected to a middle of the rotating shaft 10. A side of the rotating shaft 10 away from the connecting rod 21 is fixedly provided with the two positioning mobile frames 22. One of the two positioning mobile frames 22 is arranged at one side of the connecting rod, and the other of the two positioning mobile frames is arranged at the other side of the connecting rod 21. An end of each of the two positioning mobile frames 22 away from the rotating shaft 10 is fixedly provided with a second bearing 23. Two second bearings 23 are arranged coaxially. The positioning roller 12 is rotatably arranged between the two second bearings 23. One end of the rotating shaft 10 is rotatably connected with one end of the two first bearings 13, and the other end of the rotating shaft is rotatably connected with the other of the two first bearings. An end of the connecting rod 21 away from the rotating shaft 10 is rotatably connected to a top of the drive rod 9. A retractable end of the cylinder 8 is connected with the drive rod 9. The cylinder 8 is configured to drive the drive rod 9 to extend and retract along the axial direction of the drive rod 9, and the drive rod 9 is configured to drive the connecting rod 21 to turn over to drive the rotating shaft 10 to rotate. The rotating shaft 10 is configured to drive the two positioning mobile frames 22 and the positioning roller 12 rotatably connected between the two positioning mobile frames 22 to turn over to make the positioning roller 12 tangent to the tread of the radial self-sealing tire, so that when a supporting machine drives the truck-bus radial self-sealing tire to rotate at high speed, the positioning roller 12 can abut against the tire tread, so as to avoid the violent jumping of the truck-bus radial self-sealing tire, ensuring the even coating of the truck-bus radial self-sealing tire. In addition, considering that the positioning roller 12 is rotatably arranged between the two second bearings 23, the truck-bus radial self-sealing tire can drive the positioning roller 12 to rotate around the central axis of the two second bearings 23 when rotating, so as to avoid a strong friction between the positioning roller 12 and the truck-bus radial self-sealing tire causing the wear of the truck-bus radial self-sealing tire.

As shown in FIG. 2, the fixing frame 4 is fixedly arranged at a bottom of an interior of the support frame 1. The fixing frame 4 is provided with a reducer 3. The reducer 3 is provided with a drive motor 2. An output end of the drive motor 2 is in transmission connection with an input end of the reducer 3. The reducer 3 is connected with the lifting frame 6. The drive motor 2 is configured to supply power for the reducer 3, and drive the lifting frame 6 to rise and fall through the reducer 3. Therefore, a height of the cylinder 8 on the lifting frame 6 can be adjusted, thereby adjusting a height of the drive rod 9 and a height of the positioning frame 11, so as to ensure that the positioning roller 12 of the positioning frame 11 can be tangent to the treads of truck-bus radial self-sealing tires with different diameters.

As shown in FIG. 2, an output end of the reducer 3 is in transmission connection with a screw rod 5. A thread insert 19 is fixedly arranged on the lifting frame 6, and is threadedly connected to the screw rod 5. The drive motor 2 is configured to drive the screw rod 5 to rotate around an axis of the screw rod 5 through the reducer 3 to allow the thread insert 19 to drive the lifting frame 6 to rise and fall, so as to adjust the height of the cylinder 8 on the lifting frame 6, thereby adjusting a height of the end of the drive rod 9 connected to the cylinder 8 and the height of the end of the positioning frame 11 connected to the drive rod 9. As a consequence, the height of one end of the positioning roller 12 of the positioning frame 11 can be adjusted to ensure that the positioning roller 12 can be tangent to the tire treads with different diameters.

In an embodiment, when the truck-bus radial self-sealing tire has a relatively large diameter, the drive motor 2 drives the screw rod 5 to rotate around the axis of the screw rod 5 through the reducer 3 to allow the thread insert 19 to drive the lifting frame 6 to rise, so as to raise the cylinder 8, drive rod 9 and positioning frame 11, so that the positioning roller 12 can be tangent to the tire tread with a large diameter. For those tires with a small diameter, the drive motor 2 drives the screw rod 5 to rotate around the axis of the screw rod 5 through the reducer 3 to allow the thread insert 19 to drive the lifting frame 6 to descend, so as to make the cylinder 8, the drive rod 9 and the positioning frame 11 descend, enabling the positioning roller 12 to be tangent to the tire tread with a small diameter.

As shown in FIG. 2, a line pipe 14 is fixedly arranged on a side of an interior of the support frame 1, and is configured to accommodate lines to prevent the lines from being exposed and damaged, so that the line pipe 14 plays a role in protecting the lines. In addition, a more elegant appearance is enabled after the lines are accommodated into the line pipe 14.

In an embodiment, as shown in FIG. 2, four corners of a bottom of the support frame 1 are fixedly connected with a support pad 15, respectively, and the support pad 15 is configured to support the support frame 1.

Figure 5:
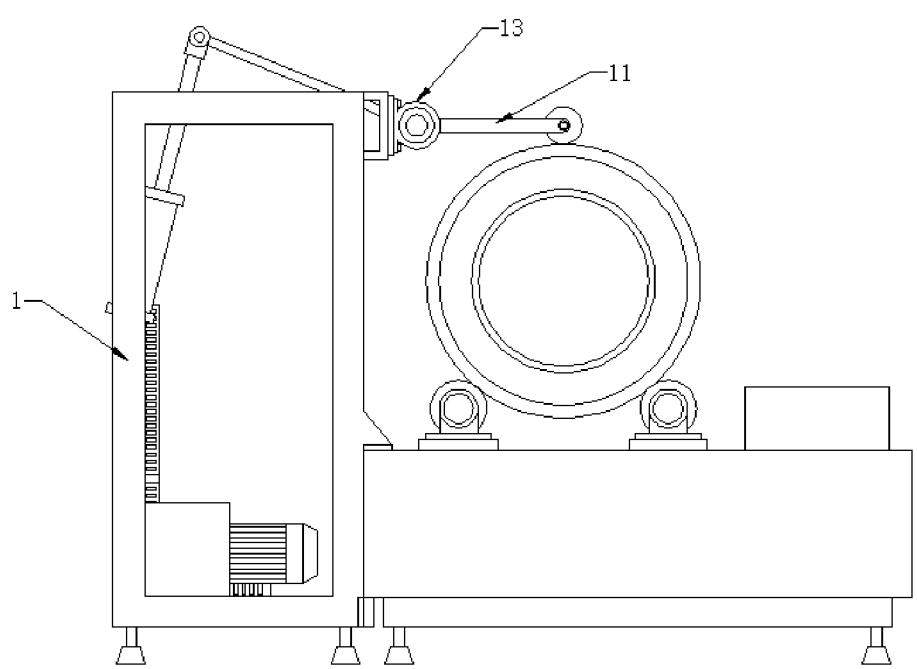
FIG. 5 schematically shows an operation of the device according to an embodiment of the present disclosure.

In an embodiment, as shown in FIG. 5, the support frame 1 is fixedly provided with two support members 17, and the two support members are arranged below the two first bearings 13. The two support members 17 are configured to abut sides of the coating equipment of the truck-bus radial self-sealing tire, so as to coordinate the device and the coating equipment. When the device for coating the truck-bus radial self-sealing tire is working, the two support members 17 are located on the sides of the coating equipment of the truck-bus radial self-sealing tire, so as to coordinate the support frame 1 and the coating equipment through the two support members 17 to improve a stability of the support frame 1.

In an embodiment, as shown in FIGS. 1-2, a mounting seat 16 is fixedly arranged at a bottom of each of two sides of the support frame 1 adjacent to the positioning frame 11. The mounting seat 16 is configured to fixedly mount the support frame 1 and the coating equipment of the truck-bus radial self-sealing tire. Specifically, a bolt can pass through the mounting seat 16 and extend into the coating equipment, so as to fixedly mount the support frame 1 and the coating equipment through the mounting seat 16 and the bolt to improve the stability of the support frame 1.

In an embodiment, as shown in FIG. 1, two mounting seats 16 are each fixedly provided with a rubber buffer pad 24. When the support frame 1 is fixedly mounted with the coating equipment through the mounting seat 16, the rubber buffer pad 24 is located between the mounting seat 16 and the coating equipment, and the rubber cushion 24 plays a role of buffer protection to reduce the wear of the connection between the support frame 1 and the coating equipment of the truck-bus radial self-sealing tire.

In the actual use, the cylinder 8 drives the drive rod 9 to extend and retract along the axial direction of the drive rod 9, and the drive rod 9 drives the positioning frame 11 to rotate around the central axis between the two first bearings 13, so that the positioning roller 12 of the positioning frame 11 is turned downward until the positioning roller 12 is tangent to the tire tread, so that when the supporting machine drives the truck-bus radial self-sealing tire to rotate at high speed, the positioning roller 12 can abut against the tread of the truck-bus radial self-sealing tire, so as to avoid the violent jumping of the tire, ensuring the uniform coating and improving the processing quality and efficiency.

For the truck-bus radial self-sealing tires with different diameters, when the drive rod 9 is driven to extend and retract along the axial direction of the drive rod 9 by the cylinder 8, if the positioning roller 12 cannot be tangent to the tread of the truck-bus radial self-sealing tire, the drive motor 2 drives the screw rod 5 to rotate around the axis of the screw rod 5 by the reducer 3, so that the thread insert 19 drives the lifting frame 6 to rise and fall. The lifting frame 6 is stably lifted and lowered along the chute 18 through the two sliding connection seats 20 to adjust the height of the cylinder 8, the height of one end of the drive rod 9 connected to the cylinder 8, and the height of one end of the positioning frame 11 connected to the drive rod 9, thereby adjusting the height of one end of the positioning roller 12 of the positioning frame 11 to ensure that the positioning roller 12 can be tangent to the tire treads with different diameters.

Described above are only preferred embodiments of the present disclosure, and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A device for assisting coating of a radial self-sealing tire of trucks and buses, comprising:
   a support frame; and
   a positioning frame;
   wherein both ends of a top of one side of the support frame are fixedly provided with a first bearing through a bearing seat, respectively; wherein the two first bearings are arranged coaxially; the positioning frame is rotatably connected between the two first bearings; two chutes are arranged spaced apart inside the support frame; the two chutes are arranged opposite to a fixing frame; the two chutes are each slidably connected with a sliding connection seat, respectively; a lifting frame is arranged between the two sliding connection seats; a rotation seat is fixedly arranged at a middle of the lifting frame; the lifting frame is rotatably connected with a cylinder through the rotation seat; a telescopic end of the cylinder is connected with a drive rod; an end of the drive rod away from the cylinder is rotatably connected to the positioning frame; the cylinder is configured to drive the drive rod to extend and retract along an axial direction of the drive rod; and the drive rod is configured to drive the positioning frame to rotate around a central axis between the two first bearings to make the positioning frame tangent to a tread of the radial self-sealing tire.

2. The device of claim 1, wherein the positioning frame comprises a connecting rod, a rotating shaft, two positioning mobile frames and a positioning roller; an end of the connecting rod is fixedly connected to a middle of the rotating shaft; a side of the rotating shaft away from the connecting rod is fixedly provided with the two positioning mobile frames; one of the two positioning mobile frames is arranged at one side of the connecting rod, and the other of the two positioning mobile frames is arranged at the other side of the connecting rod; an end of each of the two positioning mobile frames away from the rotating shaft is fixedly provided with a second bearing; the two second bearings are arranged coaxially; the positioning roller is rotatably arranged between the two second bearings; one end of the rotating shaft is rotatably connected with one of the two first bearings, and the other end of the rotating shaft is rotatably connected with the other of the two first bearings; an end of the connecting rod away from the rotating shaft is rotatably connected to a top of the drive rod; the drive rod is configured to drive the connecting rod to turn over to drive the rotating shaft to rotate; and the rotating shaft is configured to drive the two positioning mobile frames and the positioning roller rotatably connected between the two positioning mobile frames to turn over to make the positioning roller tangent to the tread of the radial self-sealing tire.

3. The device of claim 1, wherein the fixing frame is fixedly arranged at a bottom of an interior of the support frame; the fixing frame is provided with a reducer; the reducer is provided with a drive motor; an output end of the drive motor is in transmission connection with an input end of the reducer; the reducer is connected with the lifting frame; and the drive motor is configured to supply power for the reducer, and drive the lifting frame to rise and fall through the reducer.

4. The device of claim 3, wherein an output end of the reducer is in transmission connection with a screw rod; a thread insert is fixedly arranged on the lifting frame, and is threadedly connected to the screw rod; and the drive motor is configured to drive the screw rod to rotate around an axis of the screw rod through the reducer to allow the thread insert to drive the lifting frame to rise and fall.

5. The device of claim 1, wherein a line pipe is fixedly arranged on a side of an interior of the support frame, and the line pipe is configured to accommodate lines required by the device.

6. The device of claim 1, wherein four corners of a bottom of the support frame are fixedly connected with a support pad, respectively, and each of the support pads are configured to support the support frame.

7. The device of claim 1, wherein the support frame is fixedly provided with two support members, and the two support members are arranged below the two first bearings.

8. The device of claim 1, wherein a mounting seat is fixedly arranged at a bottom of each of two sides of the support frame adjacent to the positioning frame.

9. The device of claim 8, wherein the two mounting seats are each fixedly provided with a rubber buffer pad.

\* \* \* \* \*